US008032406B2

(12) United States Patent
Ouimet

(10) Patent No.: US 8,032,406 B2
(45) Date of Patent: Oct. 4, 2011

(54) SYSTEM AND METHOD OF ASSORTMENT, SPACE, AND PRICE OPTIMIZATION IN RETAIL STORE

(75) Inventor: Kenneth J. Ouimet, Scottsdale, AZ (US)

(73) Assignee: SAP AG, Walldorf (DE)

( * ) Notice: Subject to any disclaimer, the term of this patent is extended or adjusted under 35 U.S.C. 154(b) by 1283 days.

(21) Appl. No.: 11/495,086

(22) Filed: Jul. 28, 2006

(65) Prior Publication Data

US 2007/0027745 A1  Feb. 1, 2007

Related U.S. Application Data

(60) Provisional application No. 60/703,655, filed on Jul. 28, 2005, provisional application No. 60/712,630, filed on Aug. 29, 2005.

(51) Int. Cl.
*G06Q 10/00* (2006.01)

(52) U.S. Cl. ..................... 705/7.35; 705/7.37

(58) Field of Classification Search ................ 705/7.35, 705/7.37
See application file for complete search history.

(56) References Cited

U.S. PATENT DOCUMENTS

| | | | |
|---|---|---|---|
| 5,953,707 A | 9/1999 | Huang et al. | |
| 6,078,900 A * | 6/2000 | Ettl et al. | 705/28 |
| 6,308,162 B1 * | 10/2001 | Ouimet et al. | 705/7 |
| 6,341,269 B1 * | 1/2002 | Dulaney et al. | 705/22 |
| 7,092,896 B2 * | 8/2006 | Delurgio et al. | 705/10 |
| 7,379,890 B2 * | 5/2008 | Myr et al. | 705/10 |
| 7,451,065 B2 * | 11/2008 | Pednault et al. | 703/2 |
| 2002/0035537 A1 * | 3/2002 | Waller et al. | 705/37 |
| 2002/0072956 A1 * | 6/2002 | Willems et al. | 705/10 |
| 2002/0169657 A1 | 11/2002 | Singh et al. | |
| 2003/0055710 A1 | 3/2003 | Burk et al. | |
| 2003/0069780 A1 * | 4/2003 | Hailwood et al. | 705/10 |
| 2003/0200129 A1 | 10/2003 | Klaubauf et al. | |
| 2004/0064351 A1 | 4/2004 | Mikurak | |
| 2004/0236639 A1 | 11/2004 | Candadai et al. | |
| 2005/0044274 A1 | 2/2005 | Deming et al. | |
| 2006/0149634 A1 | 7/2006 | Pelegrin et al. | |
| 2007/0208608 A1 | 9/2007 | Amerasinghe et al. | |

OTHER PUBLICATIONS

Alain Bultez et al ("Asymmetric Cannibalism in Retail Assortments," Journal of Retailing, Summer 1989).*

(Continued)

*Primary Examiner* — Romain Jeanty
*Assistant Examiner* — George H Walker
(74) *Attorney, Agent, or Firm* — Buckley, Maschoff & Talwalkar LLC

(57) ABSTRACT

A computer-implemented method involves modeling of product decisions in a retail store. The product decision variables are profit, assortment, placement, promotion, and inventory. Various rules and constraints such as facing elasticity, shelf replenishment costs, shelf space, carrying costs, facing capacity, slotting fees, and cannibalization are defined for multiple product decision variables. An objective function utilizes the rules and constraints for the multiple product decision variables. The objective function model is resolved by uses nested loops to solve for a first variable, and then using the first variable to solve for a second variable. Each decision variable in the objective function is controllable by externally determined multipliers. The objective function simultaneously models each of the multiple product decision variables by iteratively resolving the objective function into values which optimize sales, revenue, and profit for the retail store. The model is output in graphic format.

29 Claims, 3 Drawing Sheets

OTHER PUBLICATIONS

Borin, Norm et al, "Category management models: Where do we go from here?" American Marketing Association. Conference Proceedings. Chicago: 2002. vol. 13 p. 151.*

Fred S. Zufryden. "A Dynamic Programming Approach for Product Selection and Supermarket Shelf-Space Allocation" The Journal of the Operational Research Society, vol. 37, No. 4 (Apr. 1986), pp. 413-422.*

Alain Bultez et al ("Asymmetric Cannibalism in Retail Assortments," Journal of Retailing, Summer 1989).*

Borin et al. "A model for dtermining retail product category assortment and shelf space allocation"., Decision Science 25 (1994) 359.*

Desmet et al., "Estimation of product category sales responsiveness to allocated shelf space"., International Journal of Research in Marketing 15 (1998); pp. 443-457.

Borin et al., "A model for determining retail product category assortment and shelf space allocation"., Decision Science 25 (1994) 359.

Corstjens et al., "A model for optimizing retail space allocation"., Management Science, vol. 27, No. 7; Jul. 1981, pp. 822-833.

Urban, Timothy L. "An inventory—Theoretic Approach to product assortment and shelf-space allocation"., Journal of Retaining, 74:1 (1998); pp. 15-35.

Bultez et al., "Asymmetric cannibalism in retail assortments" Journal of Retailing: Summer 1989; 65, 2; pp. 153-192.

Irion et al., A piecewise Linearization framework for retail shelf space management model. Technical report, School of Industrial and Systems Engineering, Georgia Institute of Technology, Atlanta, GA 30332-0205. http://www.optimization-online.org/DB_FILE/2004/10/967.pdf.

"Non-Final Office Action" mailed Jun. 10, 2010, for U.S. Appl. No. 11/468,266, entitled "System and Method of Modeling and Optimizing Product Parameters from Hierarchical Structure", filed Aug. 29, 2006, 18pgs.

"Final Office Action" mailed Dec. 20, 2010, for U.S. Appl. No. 11/468,266, entitled "System and Method of Modeling and Optimizing Product Parameters from Hierarchical Structure", filed Aug. 29, 2006, 18pgs.

* cited by examiner

US 8,032,406 B2

SYSTEM AND METHOD OF ASSORTMENT, SPACE, AND PRICE OPTIMIZATION IN RETAIL STORE

CLAIM TO DOMESTIC PRIORITY

The present non-provisional patent application claims priority to provisional application Ser. No. 60/703,655, entitled "Assortment, Space and Price Optimization," filed on Jul. 28, 2005, and to provisional application No. 60/712,630, entitled "Retail Resource Management," filed Aug. 29, 2005.

FIELD OF THE INVENTION

The present invention relates in general to statistical modeling for retail stores and, more particularly, to a system and method for modeling and optimizing product decisions such as assortment, space, placement, promotion, inventory, and price in retail stores.

BACKGROUND OF THE INVENTION

Retail stores are in business to sell merchandise and make a profit. Store managers are most concerned with product-related marketing and decisions such as product placement, assortment, space, price, promotion, and inventory. If the products are non-optimized in terms of these product decisions, then sales can be lost and profit will be less than what would otherwise be possible in an optimal system. For example, if the product assortment, space, or inventory is not properly selected or maintained, then the consumer is less likely to buy these products. If price is too high or too low, then profit can be lost. If promotions are not properly targeted, then marketing efforts will be wasted. If the product placement is poorly laid-out, then the store loses sales.

In order to maximize the outcome of product related decisions, retail store management has used statistical modeling and strategic planning to optimize the decision making process for each of the product decisions. Economic modeling and planning is commonly used to estimate or predict the performance and outcome of real systems, given specific sets of input data of interest. A model is a mathematical expression or representation which predicts the outcome or behavior of the system under a variety of conditions. An economic-based system will have many variables and influences which determine its behavior. In one sense, it is relatively easy to review historical data, understand its past performance, and state with relative certainty that the system's past behavior was indeed driven by the historical data. A much more difficult task, but one that is extremely important and valuable, is to generate a mathematical model of the system which predicts how the system will behave, or would have behaved, with different sets of data and assumptions. The field of probability and statistics has provided many tools which allow predictions to be made with reasonable certainty and acceptable levels of confidence.

In its basic form, the economic model can be viewed as a predicted or anticipated outcome of a mathematical expression, as driven by a given set of input data and assumptions. The input data is processed through the mathematical expression representing either the expected or current behavior of the real system. The mathematical expression is formulated or derived from principles of probability and statistics, often by analyzing historical data and corresponding known outcomes, to achieve an accurate correlation of the expected behavior of the system to other sets of data. In other words, the model should be able to predict the outcome or response of the system to a specific set of data being considered or proposed, within a level of confidence, or an acceptable level of uncertainty. As a simple test of the quality of the model, if historical data is processed through the model and the outcome of the model using that historical data is closely aligned with the known historical outcome, then the model is considered to have a high confidence level over the interval. The model should then do a good job of predicting outcomes of the system to different sets of input data.

Economic modeling has many uses and applications. One emerging area in which modeling has exceptional promise is in the retail sales environment. Grocery stores, general merchandise stores, specialty shops, and other retail outlets face stiff competition for limited customers and business. Most, if not all, retail stores make every effort to maximize sales, volume, revenue, and profit. Economic modeling can be a very effective tool in helping store owners and managers achieve these goals.

Retail stores engage in many different strategies to increase sales volume, revenue, and profit. Retailers must take into account many different considerations in optimizing overall sales volume, revenue, and profit. Product assortment, space, and inventory must be considered. Product price is also important. Product placement in terms of aisle, shelf height, page, and adjacencies must be taken into account. Product promotion is an important factor.

Retailers have used a variety of modeling tools to represent and optimize one or more of the product decisions described above, i.e., product placement, assortment, space, price, promotion, and inventory. One modeling tool may optimize for placement. Another modeling tool will optimize for product assortment, space, and inventory. Yet another modeling tool may optimize for price. Still another modeling tool will predict the optimal promotions. Each modeling tool may yield good results for the specific criteria being considered. However, historical modeling tools generally optimize for only one product decision. The process of optimizing one product decision may not necessarily optimize another product decision. Indeed, optimizing one product decision may be counter-productive to the best solution for another product decision. For example, optimizing product placement, e.g., giving a product a low visibility location, may be counter to optimizing product promotion in that customers may have difficulty finding the advertised product.

By optimizing for only one product decision, or individually for multiple product decisions, then the overall product sales and profit will be sub-optimal. With the present modeling tools, it is difficult, if not impossible, to optimize for all product decisions at once. Either certain product decisions are not considered, or the process of optimizing certain product decisions will detract from other product decisions. In any case, the overall product sales and profit, taking into account all product decisions, is not optimized with present modeling tools.

SUMMARY OF THE INVENTION

In one embodiment, the present invention is a computer-implemented method of modeling product decisions in a retail store comprising the steps of defining rules and constraints for multiple product decision variables, providing an objective function that utilizes the rules and constraints for the multiple product decision variables, and simultaneously modeling each of the multiple product decision variables by iteratively resolving the objective function into values which optimize sales, revenue, and profit for the retail store.

In another embodiment, the present invention is a method of modeling product decision variables in a retail environment comprising the steps of defining rules and constraints for a plurality of product decision variables, providing an objective function in terms of the rules and constraints for the plurality of product decision variables, and simultaneously modeling each of the plurality of product decision variables by resolving the objective function into values which optimize sales, revenue, and profit for the retail store.

In another embodiment, the present invention is a computer program product usable with a programmable computer processor having a computer readable program code embodied therein comprising computer readable program code which defines rules and constraints for a plurality of product decision variables, provides an objective function in terms of the rules and constraints for the plurality of product decision variables, and simultaneously models each of the plurality of product decision variables by resolving the objective function into values which optimize sales, revenue, and profit for the retail store.

In another embodiment, the present invention is a computer system for modeling product decision variables in a retail environment comprising means for defining rules and constraints for a plurality of product decision variables, means for providing an objective function in terms of the rules and constraints for the plurality of product decision variables, and means for simultaneously modeling each of the plurality of product decision variables by resolving the objective function into values which optimize sales, revenue, and profit for the retail store.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
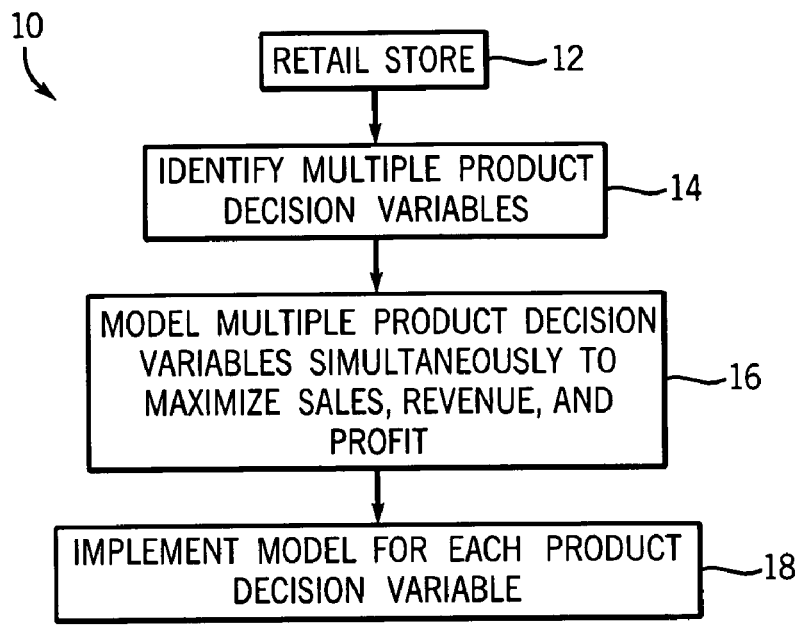
FIG. 1 is a block diagram of retail business process using a modeling tool to simultaneously resolve multiple product decisions.

Referring to FIG. 1, in retail process 10, retail store (retailer) 12 has certain product lines or services available for sale to customers as part of its business plan. The terms products and services are used interchangeably in the present discussion. Retailer 12 may be a food store chain, general products retailer, drug store, clothing store, discount warehouse, department store, specialty store, etc. A store may be a single location, or a chain or logical group of stores.

Retailer 12 desires to optimize multiple product decisions in order to maximize sales, revenue, and profitability. Retailer 12 has the ability to set pricing, order inventory, run promotions, arrange its product displays, collect and maintain historical sales data, and adjust its strategic business plan. The management team of retailer 12 is held accountable for market share, profits, and overall success and growth of the business. While the present discussion will center around retailer 12, it is understood that the economic modeling tools and data processing system described herein are applicable to other large enterprises and businesses having similar goals, constraints, and needs.

Retailer 12 has a business or operational plan. The business plan includes many planning, analyzing, and decision-making steps and operations. The business plan gives retailer 12 the ability to evaluate performance and trends, make strategic decisions, set pricing, order inventory, formulate and run promotions, hire employees, expand stores, add and remove product lines, organize product shelving and displays, select signage, and the like. The business plan allows retailer 12 to analyze data, evaluate alternatives, run forecasts, and make operational decisions. Retailer 12 can change the business plan as needed. As one important tool to allow retailer 12 to successfully execute on its business plan, the management team needs accurate economic models.

Economic and financial modeling has many uses and applications; it is an important business tool which allows companies to conduct business planning, forecast demand, manage supply chains, control inventory, manage manufacturing, predict revenue, and optimize price and profit. One emerging area in which modeling has exceptional promise is in the retail sales environment. Grocery stores, general merchandise stores, specialty shops, and other retail outlets face stiff competition for limited customers and business. Most if not all retail stores make every effort to maximize sales, volume, revenue, and profit. Economic modeling can be a very effective tool in helping store owners and managers achieve these goals.

From its business plan, retailer 12 provides certain observable data and assumptions to an enterprise model. The enterprise model includes the concept of economic models as well as process, placement, assortment, pricing, scheduling, inventory, optimization, supply, demand, and other decision-based modeling. The enterprise model performs a series of complex calculations and mathematical operations to predict and forecast the business functions in which retailer 12 is most interested. Retailer 12 receives back specific forecasts and predictions, usually in graphic form to aid in understanding the retail system. The output of the model is a report, graph, chart, table, or other analysis, which represents the model's forecasts and predictions based on the model parameters and the given set of data and assumptions. The report allows retailer 12 to make operational decisions.

Retail stores 12 are interested in optimizing product sales, revenue, and profit while taking into account multiple product decisions. One product decision is assortment, space, and inventory. Assortment refers to which products will be placed on the retail shelves. Space refers to how much area will be allocated to each product. Inventory refers to how much product will be maintained by retailer 12, whether on the shelf, in the stockroom, or in other warehousing facilities. Another product decision is product placement which includes selection of aisle, front of store, end-aisle, shelf height, page, and adjacencies. Another product decision is pricing, which spans the entire product life cycle from introduction through termination of the product line. Another product decision is promotion, which includes special offers, media exposure, and timing.

Each of the product decisions, including placement, assortment, space, price, promotion, and inventory, is important to optimizing product sales, revenue, and profit. If the customer cannot find a product, or a product does not catch his or her eye, or if there is insufficient stock on the shelf to meet demand, then sales may be lost. If the price is too high or too low, then profit is lost. If the product is not properly promoted, then marketing efforts are wasted. If the product inventory is too high or too low, then again potential sales are lost or overhead costs are too high. Retailers must make products available, appealing, and priced-right to maximize sales and profit.

In block 14 of retail process 10, retailer 12 determines or identifies which of many possible product decisions is important to model and optimize. The present discussion will center around product assortment, space, inventory, placement, price, and promotion. In block 16, the retail process models the identified multiple product decisions simultaneously to maximize sales, revenue, and profits. In block 18, retailer 12 implements the model for each product decision, i.e. stocks its shelves and sets pricing according to the model's output. Since the model operates on multiple product decisions simultaneously, it can find the optimal combination of product decisions that achieves the best overall business plan for retailer 12. The simultaneous modeling approach has distinct advantages over the independent modeling as found in the prior art. While one individual model may determine that a particular product is not profitable and therefore not deserving of shelf space, the pricing component of the multiple decision model may ascertain that by raising the price, the product can be made profitable again.

The model allows retailer 12 to define rules and constraints that will control the modeling process. The rules and constraints take into account certain physical, economic, and business realities that retailer 12 must manage. The following discussion considers many of the possible rules and constraints that can be placed into the product decision model. Once the rules and constraints are understood, the present statistical model for simultaneously modeling multiple product decision variables will be discussed in detail.

When considering buying decisions, customers often consider pricing, assortment (variety of products on the shelf), quality, convenience, and brand. Therefore, retailer 12 must give special attention to what products to offer, how much space to allocate (number of facings) to each product, and how much inventory to maintain on hand for immediate purchase. Product assortment is a powerful non-price competitive lever.

Retailer 12 must also consider a variety of costs, incentives, and constraints. For example, slotting fees are available as revenue to retailer 12. Slotting fees allow vendors to buy shelf space. The vendor pays fees to retailer 12 for the opportunity to utilize a certain number of facings. Retailer 12 must contend with shelf replenishment cost, i.e., the cost for a worker to put more product on the shelf and the cost of running out of stock and losing sales. There are also inventory carrying costs, which is the cost of capital dedicated to maintaining inventory.

Retailer 12 can increase sales and profit by optimizing assortment and space. Retailer 12 may decide to offer "n" different brands of products in a particular category, e.g., laundry detergent, and then decide to give each brand $f_i$ number of facings. The products have a per unit volume, so the facings consume shelf space horizontally and vertically. Brand X may have two horizontal facings and brand Y may have two horizontal by three vertical facings (six facings total). However, there is limited shelf space. Too few facings can lead to higher shelf replenishment costs or stock-outs. Too many facings waste valuable shelf space, which adds costs in inventory and cannibalizes other products. Cannibalization refers to the situation where increasing sales of one product may decrease sales of another product. Cannibalization is important in determining where sales migrate when a product is removed. Retailer 12 must take into account that different products have different sizes, margins, and velocities.

Figure 3:
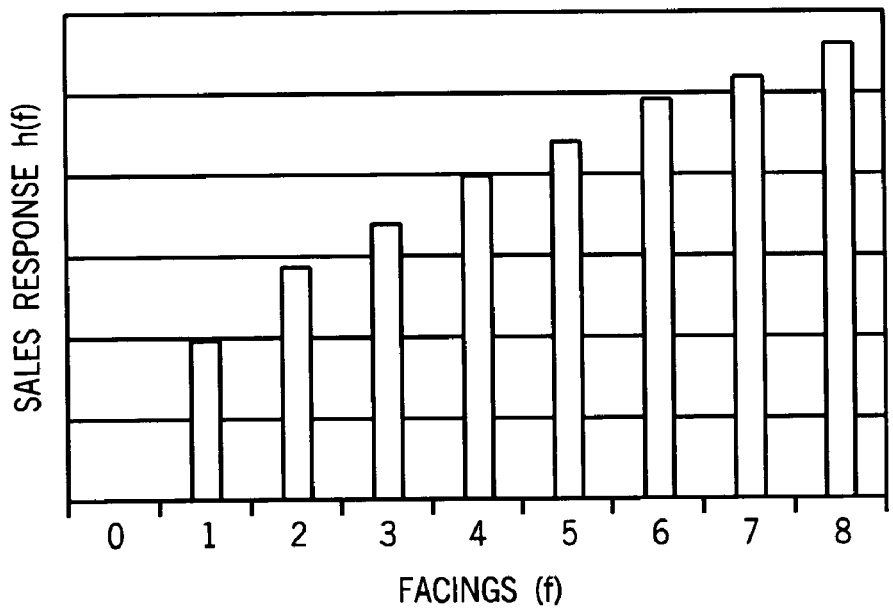
FIG. 3 is a plot of sales response versus product facings.
Figure 2:
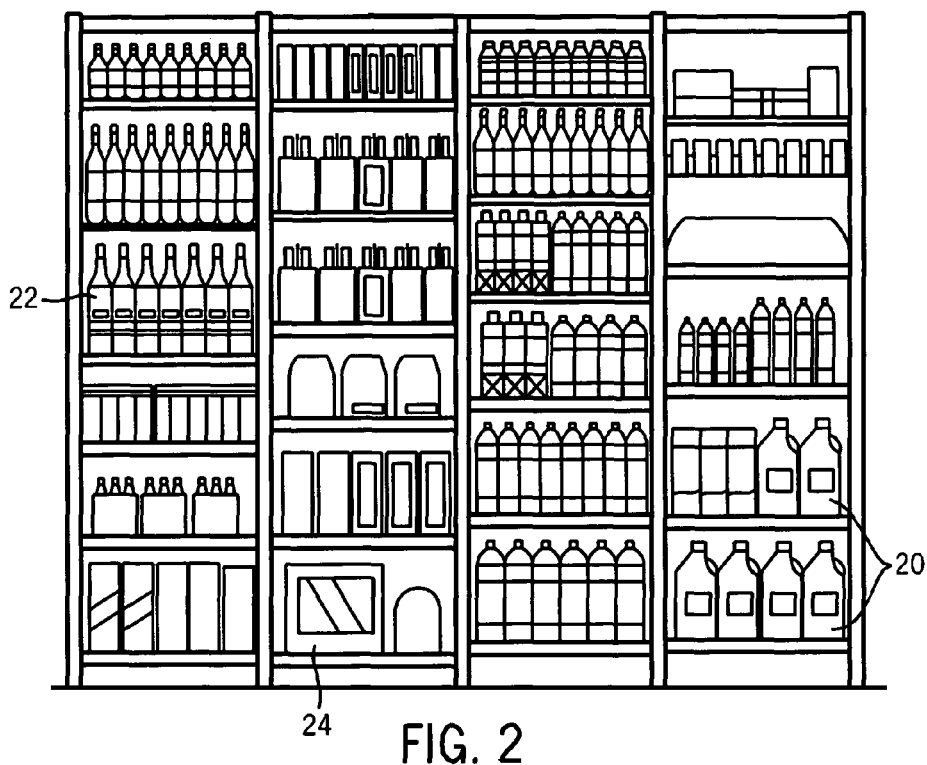
FIG. 2 is a retail store shelf with product assortment and spacing.

In developing the rules and constraints for the product decision model, retailer 12 must first consider product attributes. Product attributes includes current facings, facing area, facing capacity, slotting fee, shrinkage, and cost of capital in inventory. There are carrying costs for store delivery frequency, pack size, and minimum pack order. There are also shelf replenishment costs for fixed shelf costs, day replenishment costs, and night replenishment costs. A shelf has length, height, and depth as shown in FIG. 2. Shelf space constraints must take into account the size of each product in terms of its own length, width, height, number of facings, total shelf area, and variance between stores in total shelf area. In FIG. 2, product 20 is shown with six facings; product 22 has seven facings; and product 24 has one facing. The shelf space constraint allows retailer 12 to customize shelf layout on a per store basis as well as take into account demographics of the store location. The shelf space constraint can be given in equation (1) as:

$$\sum_i f_i * A_i \leq SA \qquad (1)$$

where: $f_i$ is facings for item $i$
$A_i$ is facing area for item $i$
$SA$ is available shelf area Another factor in optimizing assortment and spacing is facing elasticity. Facing elasticity considers how sales change with variation in space. The greater the number of facings, the greater the probability that the customer will see the product and make a purchase decision. Facing elasticity is given in equation (2) as:

$$\varepsilon_f = \frac{\%\Delta us}{\%\Delta f} \qquad (2)$$

where: numerator is percent change in unit sales
denominator is percent change in facings The facing elasticity model represents sales response h(f) versus number of facings (f) as shown in FIG. 3. Notice that more facings increases sales response h(f), but the increasing number of facings have diminishing returns with facing elasticity <1. The sales response is given in equation (3) as:

$$h(f) = f^{\varepsilon_f} \qquad (3)$$

In most cases, increasing the facings of product A will cannibalize or decrease the sales of product B. A cannibalization model is given in equation (4) as:

$$g(p) \Rightarrow g(p)h(f) \qquad (4)$$

The shelf replenishment costs are given in equations (5) and (6). Shelf capacity (SC) is the maximum units stored on a shelf. In equation (5), shelf capacity is a function of facings and facing capacity (FC). In equation (6), shelf replenishment frequency is a function of unit sales and shelf capacity.

$$SC_i = f_i * FC_i \quad (5)$$

$$v_i^{shelf} = \frac{US_i}{SC_i} \quad (6)$$

Shelf replenishment costs are generally linear with shelf replenishment frequency, although the slope of the function differs between night and day. Day costs are generally higher and will cause a greater slope for shelf replenishment costs.

Carrying costs take into account cost of capital, shrinkage, cost of product, and store inventory. Carrying costs are explained in equations (7) and (8) as follows:

$$I_i^{max} = \frac{US_i}{DF_i} \quad (7)$$

$$CC_i = r_i * c_i * I_i^{max} \quad (8)$$

where
$CC_i$ is store delivery frequency
$DF_i$ is store delivery frequency
$r_i$ is cost of capital
$c_i$ is cost of product With a number of rules and constraints understood, the discussion turns to the product decision model. An important feature of the model is its ability to simultaneously resolve multiple product decisions, e.g. assortment, space, inventory, placement, price, and promotion. The model includes a general objective function that is further defined in terms of individual relationships. The objective function is resolved iteratively by starting with an initial value and then using each iteration of the model to provide values for the next iteration. Once the objective function is maximized, the product decisions that went into the model are optimized. The output of the model is a report that retailer 12 can use to implement the results of the modeling exercise. The report can be graphical in format and give optimized price, facings, assortment, and placement. The report can further provide tabular data on projected unit sales, gross profit, contribution profit, slotting fees, shelf replenishment costs, and carrying costs.

The product decision model uses an objective function to resolve the various rules and constraints that will maximize sales, revenue, and profit. The general format of the objective function is given in equations (9)-(11). Notice that the objective function takes into consideration various decision variables, such as account profit, sales, price image, and shelf area. The Lagrange multiplier $\lambda$ provides a control mechanism to set different strategies and control individual decision variables. Equations (10) and (11) break down the general equation (9) into item components.

$$\max \theta[\{x\}] = \pi[\{x\}, \{us\}] + \lambda^{ds} DS[\{us\}] + \lambda^{im} PI[\{x\}] + \lambda^{sa} SA[\{x\}] \quad (9)$$

$$= \sum_i \theta_i[x_i, us_i] \quad (10)$$

$$\theta_i[x_i, us_i] = \pi_i[\{x_i\}, \{us\}] + \lambda^{ds} DS_i[\{us_i\}] + \lambda^{im} PI_i[\{x_i\}] + \lambda^{sa} SA_i[\{x_i\}] \quad (11)$$

where:

$$SA_i[x_i] = x_i A_i$$

$$PI_i[x_i] = r_i(g_i(p_i)h_i(x_i)\lfloor p_i, x_i \rfloor - g_i(p_i)h_i(x_i)[x_i, r_i])$$

$$DS_i[us_i] = us_i P_i$$

$$\pi_i[us_i, x_i] = us_i(p_i - c_i) + SF_i[x_i] - SRC_i[us_i, x_i] - CC_i[us_i]$$

$\pi$ is profit
$x_i$ is a decision variable (e.g. facings) for each item i
$A_i$ is area per facing
$us_i$ is units sales
$\lambda^{ds}$ is Lagrange multiplier for dollar sales
$DS_i$ is dollar sales
$\lambda^{im}$ is Lagrange multiplier for price image
$PI_i$ is price image
$\lambda^{sa}$ is Lagrange multiplier for shelf area
$SA_i$ is shelf area
$c_i$ is cost
$p_i$ is price
$r_i$ is reference price Various costs and constraints are defined in the following equations.

$$us_i[\{x_i\}] = D(t) \frac{g_i(p_i)h_i(x_i)}{y[\{x\}]} \quad (12)$$

$$y[\{x\}] = \frac{\psi \sum_k r_k g_k[x_k]}{\bar{Z}} + (1 - \psi) \quad (13)$$

$$RC_i[\{x_i, us_i\}] = \begin{cases} c_i^{r,fix} + c_i^{r,night} w_i, & w \le 1 \\ c_i^{r,fix} + c_i^{r,night} + c_i^{r,day}(w_i - 1), & w > 1 \end{cases} \quad (14)$$

$$w_i[x_i, us_i] = \frac{us_i}{x_i FC_i} \quad (15)$$

$$CC_i[\{us_i\}] = r^c c_i \frac{us_i}{DF_i} \quad (16)$$

$$SF_i[x_i] = x_i SF_i^{pf} \quad (17)$$

where
$RC_i$ is shelf replenishment cost model
$w_i$ is shelf replenishment frequency
FC is facing capacity (units per facing)
$C_i^{r,fix}$ is fixed replenishment cost
$C_i^{r,night}$ is night replenishment cost
$C_i^{r,day}$ is day replenishment cost
$CC_i$ is carrying cost model
$f^c$ is cost of capital
$c_i$ is product cost
$DF_i$ is delivery frequency
$SF_i$ is slotting fee per facing The initialization of the objective function requires estimates for y and γ, see equations (18) and (19). The current store values, e.g. current number of facings, are used for estimate $x=x^c$.

$$y^0 = y[\{x^c\}] \qquad (18)$$

$$\gamma^0 = \frac{\theta[\{x^c\}] - \lambda^{sa} SA[\{x^c\}]}{y^0} \qquad (19)$$

where: $y^0$ is initial value of y
$\gamma^0$ is initial value of $\gamma$

With the initial value $y^0$ and $\gamma^0$, the process of maximizing the objective function of equation (9) begins with the nested algorithm as given in equations (20)-(24).

$$\gamma^* = \max \theta[\{f(\gamma)\}] \qquad (20)$$

$$y[x^*|y^*, \gamma] = \frac{\psi \sum_k r_k g_k [x^*[y^*, \gamma]]}{\overline{Z}} + (1 - \psi) \qquad (21)$$

$$\rightarrow y^*(\gamma) : \max \Omega[y|\gamma] \qquad (22)$$

$$\rightarrow x^*[y,\gamma] : \max \Omega_i[x_i|y,\gamma] \qquad (23)$$

$$\Omega_i[x_i|y, \gamma] = \pi_i[us_ix_i] + \lambda^{ds} us_i p_i + \lambda^{im} us_i r_i + \qquad (24)$$
$$\lambda^{sa} x_i A_i - \frac{\gamma \psi r_i g_i(p_i) h_i(x_i)}{\overline{Z}}$$

Equations (20)-(24) represent a nested loop which is iteratively solved to maximize θ from equation (9). In the highest loop, the goal is to find γ=γ* that maximizes θ. In the lowest loop defined by equations (22) and (23), the goal is to find the values of x* and y* to maximize Ω in terms of y and γ. The solution starts with initial values of $y^0$ and $\gamma^0$ as given by equations (18) and (19). In maximizing Ω in equations (23) and (24), the function may be calculated in discrete steps, checking all values of x and y, or the function may be calculated in a continuous fashion, e.g. by gradient search. Within the lowest loop, once a set of values for x* and y* are determined using iterative values of y and γ, then these values for x* and y* are inserted into equation (21) to determine a value for the function of y as given. This value for y is inserted into equations (12) and (13) to determine unit sales. The value for unit sales is inserted into equations (10) and (11) to determine θ.

The process repeats with each new calculate of values. That is, each time new values for y and γ are found, the loop returns to equations (23) and (24) to determine new values for x* and y*. Each time new values for x* and y* are calculated, the loop returns to equation (21) to re-calculate the function of y. The function of y is again feed into equations (12) and (13) for an updated unit sales, which in turn gives a new value for θ. The loop repeats until the objective function θ is maximized to provide optimal values for the product decision variables being considered. One or more of the product decision variables including assortment, space, inventory, placement, price, and promotion can be readily integrated into equations (20)-(24) to simultaneously resolve the multiple model parameters. Thus, the product decision modeling tool simultaneously optimizes each of the multiple product decision variables by iteratively resolving the objective function from equations (9)-(11) into values which optimize sales, revenue, and profit for retailer 12. Maximizing the objective function θ as described above will optimize these parameters for the retail store.

In one embodiment, the product decision model is configured to model all product decision variables simultaneously. Alternatively, the model can be configured to model individual product decision variables, or specific combinations of the product decision variables.

Figure 4:
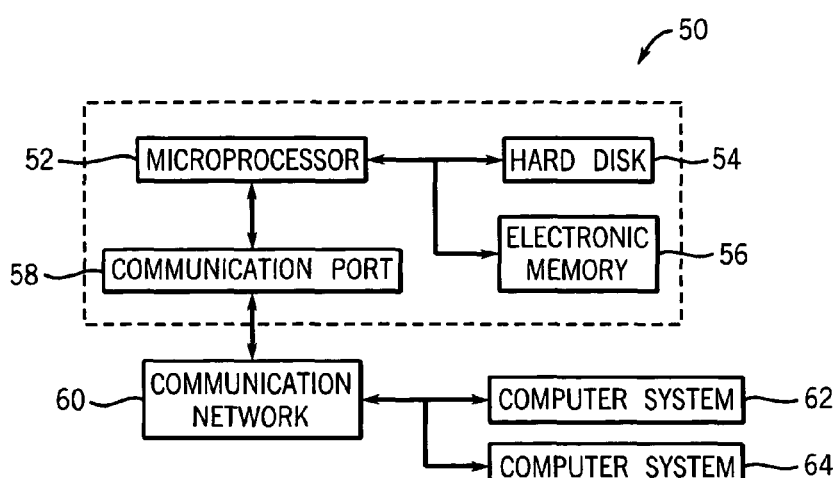
FIG. 4 is a computer system for executing the model tool.

FIG. 4 illustrates a simplified computer system 50 for executing the software program used in the product decision modeling tool. Computer system 50 is a general-purpose computer including a central processing unit or microprocessor 52, mass storage device or hard disk 54, electronic memory 56, and communication port 58. Communication port 58 represents a modem, high-speed Ethernet link, or other electronic connection to transmit and receive input/output (I/O) data with respect to other computer systems.

Computer 50 is shown connected to communication network 60 by way of communication port 58. Communication network 60 can be a local and secure communication network such as an Ethernet network, global secure network, or open architecture such as the Internet. Computer systems 62 and 64 can be configured as shown for computer 50 or dedicated and secure data terminals. Computers 62 and 64 are also connected to communication network 60. Computers 50, 62, and 64 transmit and receive information and data over communication network 60.

When used as a standalone unit, computer 50 can be located in any convenient location. When used as part of a computer network, computers 50, 62, and 64 can be physically located in any location with access to a modem or communication link to network 60. For example, computer 50 can be located in the main office of retailer 12. Computer 62 can be located in one retail store. Computer 64 can be located in another retail store. Alternatively, the computers can be mobile and follow the users to any convenient location, e.g., remote offices, customer locations, hotel rooms, residences, vehicles, public places, or other locales with electronic access to communication network 60.

Each of the computers runs application software and computer programs which can be used to display user-interface screens, execute the functionality, and provide the features of the aforedescribed product decision modeling tool. In one embodiment, the screens and functionality come from the application software, i.e., the product decision modeling tool runs directly on one of the computer systems. Alternatively, the screens and functionality can be provided remotely from one or more websites on the Internet. The websites are generally restricted-access and require passwords or other authorization for accessibility. Communications through such websites may be encrypted using secure encryption algorithms. Alternatively, the screens and functionality are accessible only on the secure private network, such as Virtual Private Network (VPN), with proper authorization.

The software is originally provided on computer-readable media, such as compact disks (CDs), magnetic tape, or other mass storage medium. Alternatively, the software is downloaded from electronic links such as the host or vendor website. The software is installed onto the computer system hard drive 54 and/or electronic memory 56, and is accessed and controlled by the computer's operating system. Software updates are also electronically available on mass storage media or downloadable from the host or vendor website. The software, as provided on the computer-readable media or downloaded from electronic links, represents a computer program product usable with a programmable computer processor having a computer-readable program code embodied therein. The software contains one or more programming modules, subroutines, computer links, and compilations of executable code, which perform the functions of the product decision modeling tool. The user interacts with the software via keyboard, mouse, voice recognition, and other user-interface devices connected to the computer system.

The software stores information and data related to the modeling tool in a database or file structure located on any one of, or combination of, hard drives 54 of the computers 50, 62, and/or 64. More generally, the information used in the modeling tool can be stored on any mass storage device accessible to computers 50, 62, and/or 64. The mass storage device for storing the modeling tool data may be part of a distributed computer system.

In the case of Internet-based websites, the interface screens are implemented as one or more webpages for receiving, viewing, and transmitting information related to the modeling tool. A host service provider may set up and administer the website from computer 50 located in the retailer's home office. The employee accesses the webpages from computers 62 and 64 via communication network 60.

Figure 5:
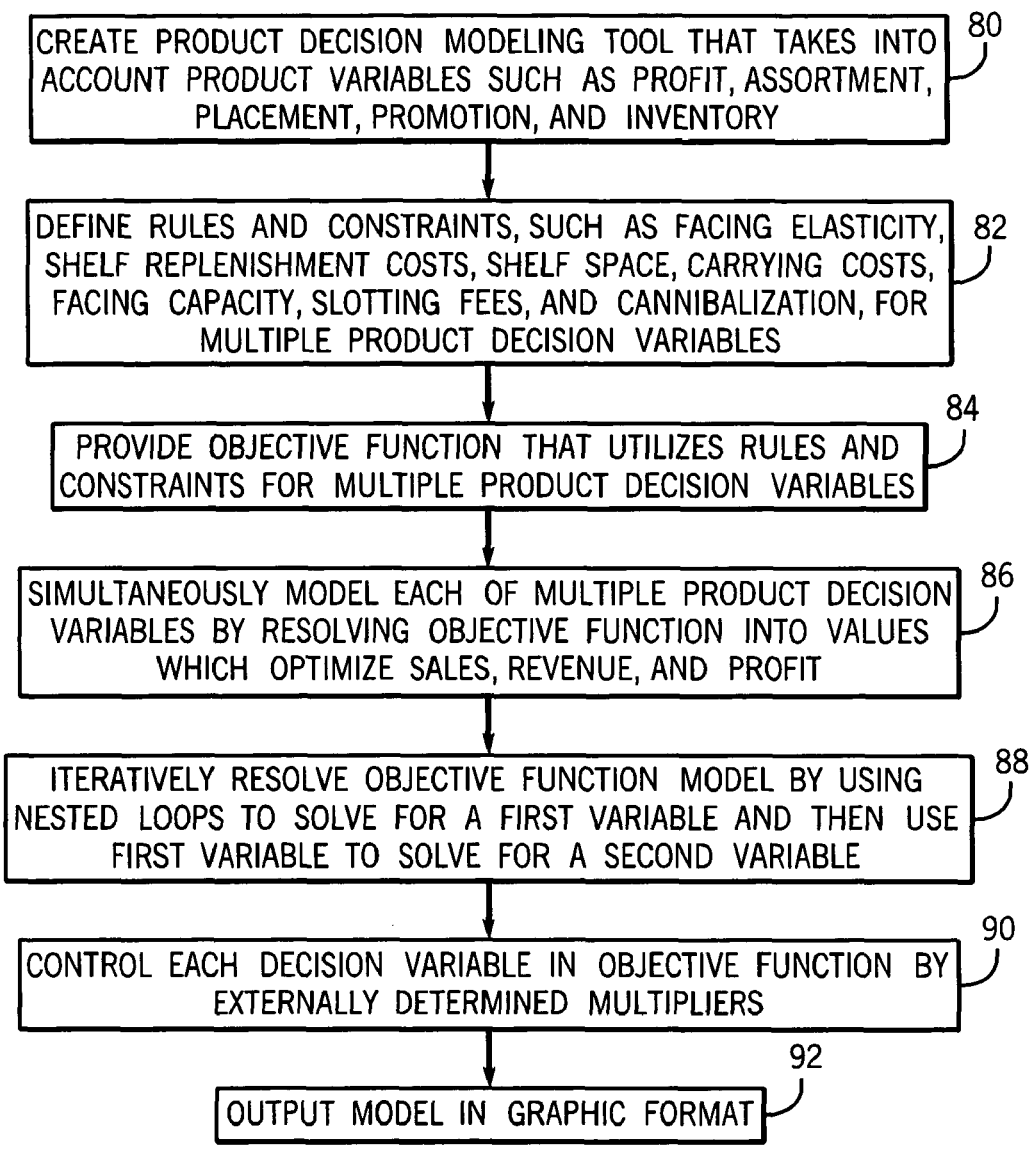
FIG. 5 illustrates the steps of simultaneously modeling multiple product decisions in retail stores.

As further explanation, FIG. 5 illustrates a process flowchart of one embodiment of the product decision modeling tool. In step 80, the product decision modeling tool takes into account product variables such as profit, assortment, placement, promotion, and inventory. In step 82, rules and constraints are defined for multiple product decision variables. The rules and constraints include facing elasticity, shelf replenishment costs, shelf space, carrying costs, facing capacity, slotting fees, and cannibalization. In step 84, an objective function utilizes the rules and constraints for the multiple product decision variables. In step 86, each of the multiple product decision variables are simultaneously modeled by resolving the objective function into values which optimize sales, revenue, and profit for the retail store. In step 88, the objective function model is iteratively resolved by using nested loops to solve for a first variable and then using the first variable to solve for a second variable. In step 90, each decision variable in the objective function is controllable by externally determined multipliers. In step 92, the model is output in graphic format.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method of modeling, comprising:
    defining, by a computer, rules and constraints for product decision variables, wherein the product decision variables include assortment, space, inventory, placement, price and promotion;
    providing, by the computer, an objective function that utilizes the rules and constraints for the product decision variables;
    iteratively resolving, by the computer, the objective function into values which optimize sales, revenue, and profit for a retail business; and
    simultaneously optimizing, by the computer, the product decision variables including assortment, space, inventory, placement, price and promotion for the retail business by said iteratively resolving of the objective function into the values which optimize the sales, revenue, and profit for the retail business;
    wherein the objective function is $$\max \theta[\{x\}] = \pi[\{x\}, \{us\}] + \lambda^{ds} DS[\{us\}] + \lambda^{im} PI[\{x\}] + \lambda^{sa} SA[\{x\}], \text{ and}$$

max $\theta$ is the maximized objective function
    $\pi$ is profit
    x is a decision variable
    us is units sales
    $\lambda^{ds}$ is Lagrange multiplier or externally determined multiplier for dollar sales
    DS is dollar sales
    $\lambda^{im}$ is Lagrange multiplier or externally determined multiplier for price image
    PI is price image
    $\lambda^{sa}$ is Lagrange multiplier or externally determined multiplier for shelf area
    SA is shelf area.

2. The computer-implemented method of claim 1, wherein the rules and constraints are selected from the group consisting of facing elasticity, shelf replenishment costs, shelf space, carrying costs, facing capacity, slotting fees, and cannibalization.

3. The computer-implemented method of claim 1, wherein a report provides the optimized product decision variables in graphic format.

4. The computer-implemented method of claim 1, wherein the objective function is resolved by using nested loops to solve for a first variable and then using the first variable to solve for a second variable.

5. A method of modeling, comprising:
    defining, by a computer, rules and constraints for a plurality of product decision variables, wherein the product decision variables include assortment, space, inventory, placement, price and promotion and each of the product decision variables is controllable by externally determined multipliers;
    providing, by the computer, an objective function in terms of the rules and constraints for the plurality of product decision variables and the externally determined multipliers;
    resolving, by the computer, the objective function into values which optimize sales, revenue, and profit for a retail business; and
    simultaneously optimizing, by the computer, the plurality of product decision variables including assortment, space, inventory, placement, price and promotion for the retail business by said resolving of the objective function into the values which optimize the sales, revenue, and profit for the retail business;
    wherein the objective function is $$\max \theta[\{x\}] = \pi[\{x\}, \{us\}] + \lambda^{ds} DS[\{us\}] + \lambda^{im} PI[\{x\}] + \lambda^{sa} SA[\{x\}], \text{ and}$$

max $\theta$ is the maximized objective function
    $\pi$ is profit
    x is a decision variable
    us is units sales
    $\lambda^{ds}$ is Lagrange multiplier or externally determined multiplier for dollar sales
    DS is dollar sales
    $\lambda^{im}$ is Lagrange multiplier or externally determined multiplier for price image
    PI is price image
    $\lambda^{sa}$ is Lagrange multiplier or externally determined multiplier for shelf area
    SA is shelf area.

6. The method of claim 5, wherein the rules and constraints are selected from the group consisting of facing elasticity, shelf replenishment costs, shelf space, carrying costs, facing capacity, slotting fees, and cannibalization.

7. The method of claim 5, wherein a report provides the optimized product decision variables in graphic format.

8. The method of claim 5, wherein the objective function is iteratively resolved by using nested loops to solve for a first variable and then using the first variable to solve for a second variable.

9. A computer program product usable with a programmable computer processor having a non-transitory computer readable program code embodied therein, adapted to implement a method of modeling, comprising:
computer readable program code which defines rules and constraints for product decision variables including assortment, space, inventory, placement, price, and promotion;
computer readable program code which provides an objective function in terms of the rules and constraints for the product decision variables;
computer readable program code which resolves the objective function into values which optimize sales, revenue, and profit for a retail business; and
computer readable program code which simultaneously optimizes the product decision variables including assortment, space, inventory, placement, price and promotion for the retail business by said resolving of the objective function into the values which optimize the sales, revenue, and profit for the retail business;
wherein the objective function is $$\max \theta[\{x\}] = \pi[\{x\},\{us\}] + \lambda^{ds} DS[\{us\}] + \lambda^{im} PI[\{x\}] + \lambda^{sa} SA[\{x\}], \text{ and}$$

max θ is the maximized objective function
π is profit
x is a decision variable
us is units sales
$\lambda^{ds}$ is Lagrange multiplier or externally determined multiplier for dollar sales
DS is dollar sales
$\lambda^{im}$ is Lagrange multiplier or externally determined multiplier for price image
PI is price image
$\lambda^{sa}$ is Lagrange multiplier or externally determined multiplier for shelf area
SA is shelf area.

10. The computer program product of claim 9, wherein the rules and constraints are selected from the group consisting of facing elasticity, shelf replenishment costs, shelf space, carrying costs, facing capacity, slotting fees, and cannibalization.

11. The computer program product of claim 9, wherein each decision variable in the objective function is controllable by externally determined multipliers.

12. A computer system for modeling, comprising:
means for defining rules and constraints for product decision variables including assortment, space, inventory, placement, price and promotion;
means for providing an objective function in terms of the rules and constraints for the product decision variables;
means for resolving the objective function into values which optimize sales, revenue, and profit for a retail business; and
means for simultaneously optimizing the product decision variables including assortment, space, inventory, placement, price and promotion for the retail business by said resolving of the objective function into the values which optimize the sales, revenue, and profit for the retail business;
wherein the objective function is $$\max \theta[\{x\}] = \pi[\{x\},\{us\}] + \lambda^{ds} DS[\{us\}] + \lambda^{im} PI[\{x\}] + \lambda^{sa} SA[\{x\}], \text{ and}$$

max θ is the maximized objective function
π is profit
x is a decision variable
us is units sales
$\lambda^{ds}$ is Lagrange multiplier or externally determined multiplier for dollar sales
DS is dollar sales
$\lambda^{im}$ is Lagrange multiplier or externally determined multiplier for price image
PI is price image
$\lambda^{sa}$ is Lagrange multiplier or externally determined multiplier for shelf area
SA is shelf area.

13. The computer system of claim 12, wherein the rules and constraints are selected from the group consisting of facing elasticity, shelf replenishment costs, shelf space, carrying costs, facing capacity, slotting fees, and cannibalization.

14. The computer system of claim 12, wherein each decision variable in the objective function is controllable by externally determined multipliers.

15. The computer program product of claim 9, wherein a report provides the optimized product decision variables in graphic format.

16. The computer program product of claim 9, wherein the objective function is resolved by using nested loops to solve for a first variable and then using the first variable to solve for a second variable.

17. The computer system of claim 12, wherein a report provides the optimized product decision variables in graphic format.

18. The computer-implemented method of claim 12, wherein the objective function is resolved by using nested loops to solve for a first variable and then using the first variable to solve for a second variable.

19. The computer-implemented method of claim 1, wherein the price is a price charged by the retail business.

20. The computer-implemented method of claim 5, wherein the price is a price charged by the retail business.

21. The computer program product of claim 9, wherein the price is a price charged by the retail business.

22. The computer system of claim 12, wherein the price is a price charged by the retail business.

23. The computer-implemented method of claim 1, wherein each decision variable in the objective function is controllable by externally determined multipliers.

24. The computer program product of claim 9, wherein the computer readable program code which resolves the objective function into values which optimize sales, revenue, and profit for a retail business comprises:
computer readable program code which iteratively resolves the objective function into values which optimize sales, revenue, and profit for a retail business.

25. The computer system of claim 12, wherein the means for resolving the objective function into values which optimize sales, revenue, and profit for a retail business comprises:
means for iteratively resolving the objective function into values which optimize sales, revenue, and profit for a retail business.

26. A computer-implemented method comprising:
defining, by a computer, rules and constraints for product decision variables;
providing, by the computer, an objective function that utilizes the rules and constraints for the product decision variables; and
simultaneously modeling each of the product decision variables by iteratively resolving the objective function into values which optimize sales, revenue, and profit for a retail business; and
wherein the objective function is $$\max \theta[\{x\}] = \pi[\{x\}, \{us\}] + \lambda^{ds} DS[\{us\}] + \lambda^{im} PI[\{x\}] + \lambda^{sa} SA[\{x\}], \text{ and}$$

max θ is the maximized objective function
π is profit
x is a decision variable
us is units sales
$\lambda^{ds}$ is Lagrange multiplier or externally determined multiplier for dollar sales
DS is dollar sales
$\lambda^{im}$ is Lagrange multiplier or externally determined multiplier for price image
PI is price image
$\lambda^{sa}$ is Lagrange multiplier or externally determined multiplier for shelf area
SA is shelf area.

27. A computer-implemented method comprising:
defining, by a computer, rules and constraints for product decision variables;
providing, by the computer, an objective function that utilizes the rules and constraints for the product decision variables; and
simultaneously modeling each of the product decision variables by resolving the objective function into values which optimize sales, revenue, and profit for a retail business; and
wherein the objective function is $$\max \theta[\{x\}] = \pi[\{x\}, \{us\}] + \lambda^{ds} DS[\{us\}] + \lambda^{im} PI[\{x\}] + \lambda^{sa} SA[\{x\}], \text{ and}$$

max θ is the maximized objective function
π is profit
x is a decision variable
us is units sales
$\lambda^{ds}$ is Lagrange multiplier or externally determined multiplier for dollar sales
DS is dollar sales
$\lambda^{im}$ is Lagrange multiplier or externally determined multiplier for price image
PI is price image
$\lambda^{sa}$ is Lagrange multiplier or externally determined multiplier for shelf area
SA is shelf area.

28. A computer program product usable with a programmable computer processor having a non-transitory computer readable program code embodied therein, adapted to implement a method of modeling, comprising:
computer readable program code which defines rules and constraints for product decision variables;
computer readable program code which provides an objective function that utilizes the rules and constraints for the product decision variables; and
computer readable program code which simultaneously models each of the product decision variables by resolving the objective function into values which optimize sales, revenue, and profit for a retail business; and
wherein the objective function is $$\max \theta[\{x\}] = \pi[\{x\}, \{us\}] + \lambda^{ds} DS[\{us\}] + \lambda^{im} PI[\{x\}] + \lambda^{sa} SA[\{x\}], \text{ and}$$

max θ is the maximized objective function
π is profit
x is a decision variable
us is units sales
$\lambda^{ds}$ is Lagrange multiplier or externally determined multiplier for dollar sales
DS is dollar sales
$\lambda^{im}$ is Lagrange multiplier or externally determined multiplier for price image
PI is price image
$\lambda^{sa}$ is Lagrange multiplier or externally determined multiplier for shelf area
SA is shelf area.

29. A computer system comprising:
means for defining rules and constraints for product decision variables;
means for providing an objective function that utilizes the rules and constraints for the product decision variables; and
means for simultaneously modeling each of the product decision variables by resolving the objective function into values which optimize sales, revenue, and profit for a retail business; and
wherein the objective function is $$\max \theta[\{x\}] = \pi[\{x\}, \{us\}] + \lambda^{ds} DS[\{us\}] + \lambda^{im} PI[\{x\}] + \lambda^{sa} SA[\{x\}], \text{ and}$$

max θ is the maximized objective function
π is profit
x is a decision variable
us is units sales
$\lambda^{ds}$ is Lagrange multiplier or externally determined multiplier for dollar sales
DS is dollar sales
$\lambda^{im}$ is Lagrange multiplier or externally determined multiplier for price image
PI is price image
$\lambda^{sa}$ is Lagrange multiplier or externally determined multiplier for shelf area
SA is shelf area.

* * * * *